United States Patent
Futschek

(10) Patent No.: US 7,232,020 B2
(45) Date of Patent: Jun. 19, 2007

(54) TELPHER LINE WITH CONTACTLESS ENERGY AND DATA TRANSMISSION

(75) Inventor: Norbert Futschek, Potsdam (DE)

(73) Assignee: LJU Industrieelektronik GmbH (DE)

( * ) Notice: Subject to any disclaimer, the term of this patent is extended or adjusted under 35 U.S.C. 154(b) by 276 days.

(21) Appl. No.: 10/490,140

(22) PCT Filed: Apr. 26, 2002

(86) PCT No.: PCT/DE02/01578

§ 371 (c)(1),
(2), (4) Date: Jan. 25, 2005

(87) PCT Pub. No.: WO03/026915

PCT Pub. Date: Apr. 3, 2003

(65) Prior Publication Data

US 2005/0121557 A1  Jun. 9, 2005

(30) Foreign Application Priority Data

Sep. 24, 2001  (DE) .................. 101 47 859

(51) Int. Cl.
*B60L 9/00* (2006.01)
(52) U.S. Cl. ...................................... 191/10
(58) Field of Classification Search ............ 191/10, 191/45 A, 22 R, 23 A, 29 R; 340/310.11
See application file for complete search history.

(56) References Cited

U.S. PATENT DOCUMENTS

| | | | | |
|---|---|---|---|---|
| 5,886,619 A | * | 3/1999 | Takasan et al. | ............. 370/276 |
| 5,938,151 A | * | 8/1999 | Takasan et al. | ............. 246/194 |
| 6,089,512 A | * | 7/2000 | Ansorge et al. | ............. 246/194 |

* cited by examiner

*Primary Examiner*—Mark T. Le
(74) *Attorney, Agent, or Firm*—Wood, Phillips, Katz, Clari & Mortimer

(57) ABSTRACT

In an electric telpher system with non-contact power transmission between a feeder (4) placed at a spacing along a slide rail (1) for mobile transfer units (12) and an inductive current collector on the transfer unit, a data transmission loop (7) is arranged at a defined distance from the feeder for non-contact data transmission between a central control station (18) and the transfer units in such a way that its parallel conductors are located exactly within a field line of the feeder. The data transmission loop is direct-coupled with the central control station via a transmission station (10). Each transfer unit is equipped with a communication module (6) with transmit and receive coils on ferrite cores for inductive data transmission to ensure that these units can receive all information exchanged via the data transmission loop. The data transmitted by means of induction consists in sinusoidal signal sequences at two different fixed frequencies in the medium frequency range that serve as digital signals.

10 Claims, 3 Drawing Sheets

TELPHER LINE WITH CONTACTLESS ENERGY AND DATA TRANSMISSION

BACKGROUND OF THE INVENTION

1. Field of the Invention

This invention relates to an electric telpher with non-contact power transmission between a feeder arranged at a spacing along a slide rail for mobile transfer units and an inductive current collector on the transfer unit as well as with non-contact data transmission between a central control station and a controller installed on the transfer unit.

2. Background Art

In a known electric telpher system of this type, the return conductor for the feeder that is connected to a higher-frequency AC power source is the slide rail for the mobile transfer units that are equipped with a drive unit and a controller. The current collector is a ferrite core that encompasses the feeder in a U-shape with windings attached to its limbs designed for producing different feed voltages for the drive unit and the controller of the mobile transfer unit, respectively.

The initial proposal made here to also use the feeder for communication to program and remote-control the transfer units from a central control station is not feasible in practice because there is a very small signal-to-noise ratio due to the high current in the feeder and the accordingly high field density and because eliminating the resulting problems would require an unjustifiably great electrical and electronic effort.

Infrared technology is another option for non-contact data transmission in electric telpher systems. However, a data transmission system designed on this basis has spatial constraints. Data can only be transmitted from specific, locally separated points. In the meantime the transfer units are uncontrolled and cannot be influenced from outside. Reducing the distance between these communication points requires great expenditure, however.

It has also been proposed to use radio technology for data transmission; each transfer unit is equipped with a radio module and a group of overlapping radio cells is set up along the track between which the transfer units are handed over. The disadvantage of this technology is that radio contact can be impaired or lost due to external factors. Also, transfer from one radio station to another requires a major information technology effort.

It is the problem of this invention to develop a non-contact data communication system for an electric telpher with non-contact power transmission of the type mentioned above that ensures permanent central collection of information from the mobile transfer units and data transfer to control the operation of the mobile transfer units in a cost-efficient way and also guarantees that the information sent to the central control station is simultaneously received by all mobile transfer units.

SUMMARY OF THE INVENTION

The inventive idea is based on inductive power transmission from a feeder conducted along the slide way to the power consumers of the transfer unit and characterized in that a data-transmission loop whose conductors are direct-coupled with a central control station and inductively connected to the controllers of the transfer units is attached at a spacing to the feeder. The non-contact connection with the inductive data transmission loop is established via a communication module attached to the mobile transfer unit, said module comprising transmit and receive ferrite cores with a transmit or receive coil and being arranged at a small but practicable distance for the motion of the transfer units in parallel to the data transmission loop. Data is transmitted in the medium frequency range at two different, fixed sinusoidal frequencies, each representing a digital value (0 or 1).

The geometrical arrangement of the data transmission loop in front of the feeder in a single field line generated by the feeder ensures that any noise voltage induced by the feeder and its interference with inductive data transmission is low. Using inductive data transmission in the medium frequency range in the form of two different sinusoidal frequencies as digital data sequences, the data transmission loop according to the invention is a pure inductive loop not used as a waveguide or as an antenna with high-frequency electromagnetic radiation, which ensures low circuit complexity, uncritical and practicable dimensioning of terminating resistors for the data transmission loop and, last but not least, a sufficient signal-to-noise ratio between the power and the data transmission channels. The spacings between the data transmission loop and the transmit and receive ferrite cores attached to the mobile transfer unit are 5 to 10 mm and thus sufficiently wide for operating an electric telpher.

In an improved embodiment of this invention, the transmit and receive ferrite cores in the communication module are assigned to a transmit and receive coupler, a transmit and receive section, and a processing unit for transmitting or receiving and for generation and processing of data or digital sinusoidal sequences at two different frequencies. Such transmit and receive couplers as well as transmit and receive sections with processing unit are also provided at a transmission station inserted between the data transmission loop and the central control station.

In the present electric telpher system with non-contact power and data transmission, the communication path matches exactly the path of the mobile transport units. The data transmission system operated at low frequencies is capable of providing all mobile transfer units with data at low cost and at all times and control them accordingly, or of collecting information provided by these about transfer unit status, position, or distances between units and forwarding it to the central control station.

The transfer units designed according to the invention can simultaneously receive all information sent to the transmission station. In this way, a direction-independent anticollision function of the mobile transfer units can be implemented along the transport route by specific control sequences in the respective controller, without any need for additional peripherals. This local operational anticollision protection of the mobile transport units described above can be adjusted to systematic distance requirements, which is a decisive advantage as compared to all known methods along a physical transport route.

BRIEF DESCRIPTION OF THE DRAWINGS

An embodiment of the invention is explained in greater detail below with reference to the figures. Wherein.

DETAILED DESCRIPTION OF THE DRAWINGS

Figure 1:
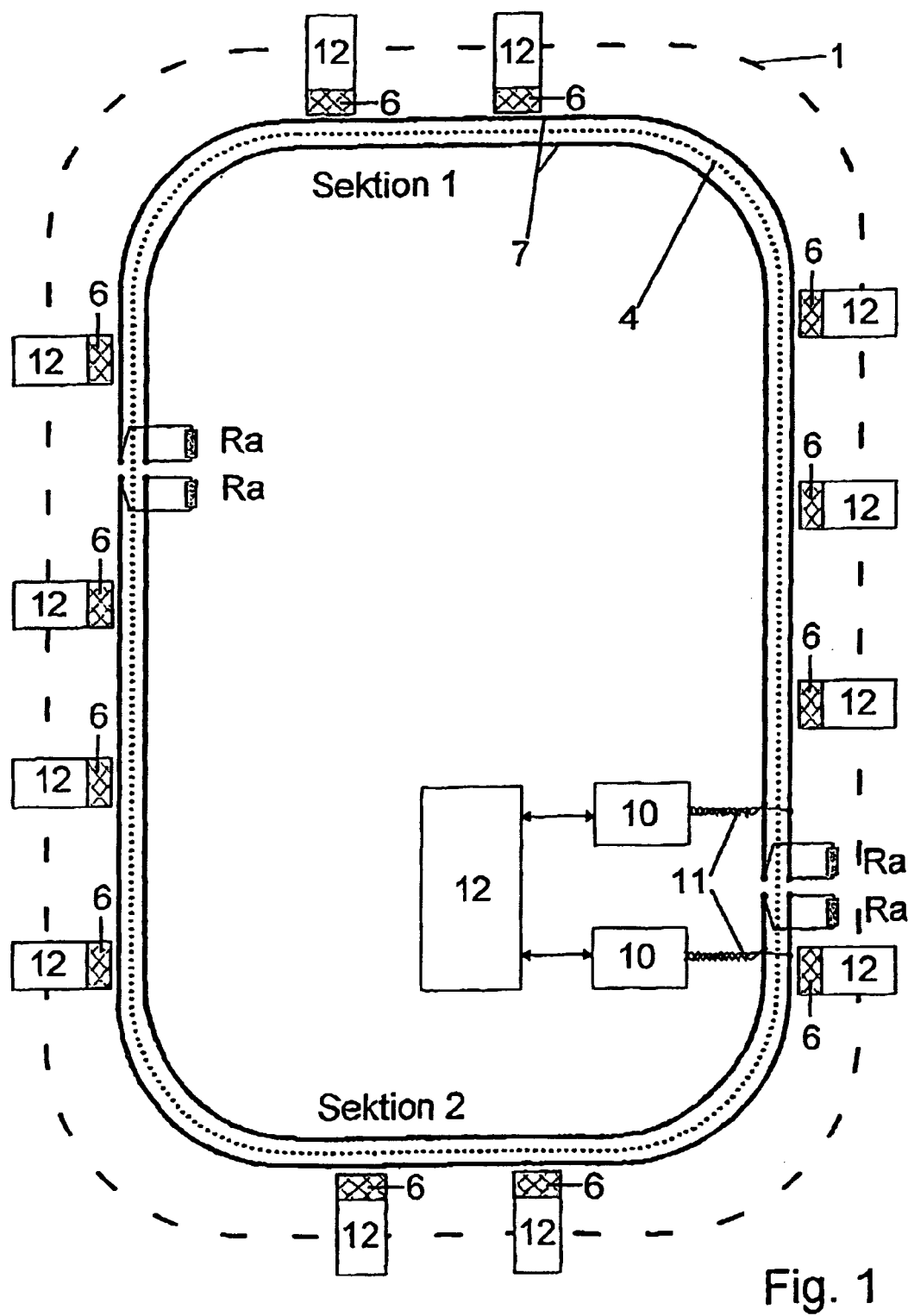
FIG. 1 is a schematic representation of an electric telpher system with non-contact data communication between its mobile transfer units and a central control station via an inductive data transmission loop.
Figure 2:
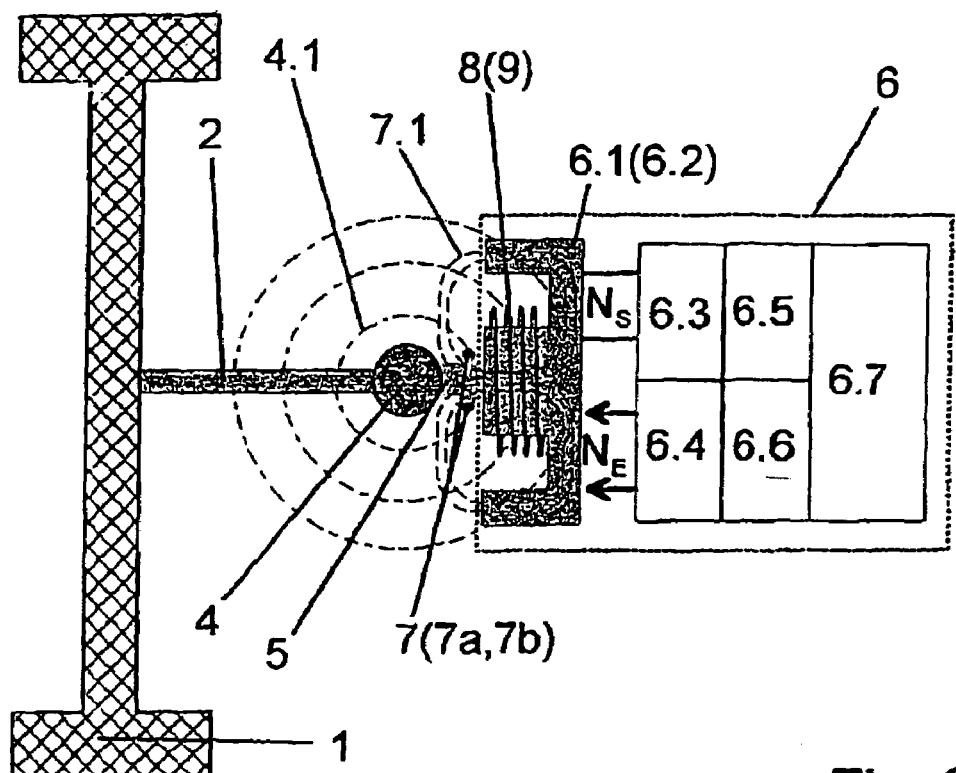
FIG. 2 shows an inductive communication module integrated in a mobile transfer unit for transmitting data between a central control station and a transfer unit via the data transmission loop.
Figure 3:
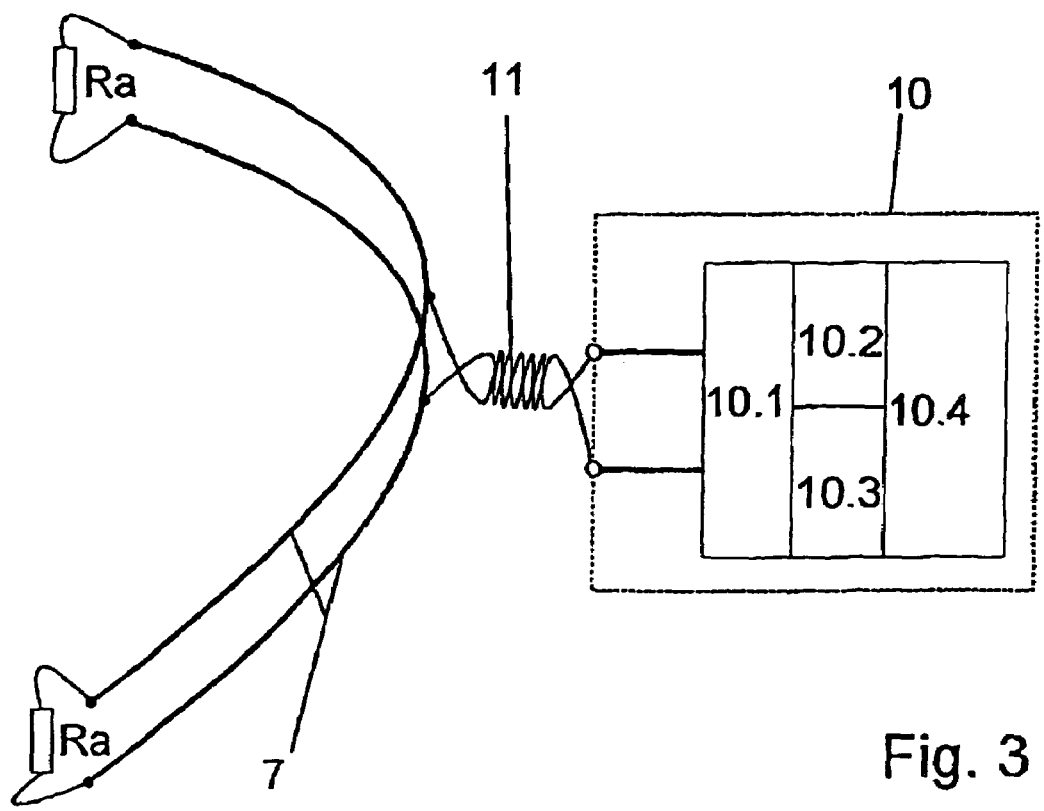
FIG. 3 shows the data transmission loop and a transmission station connected to it.
Figure 4:
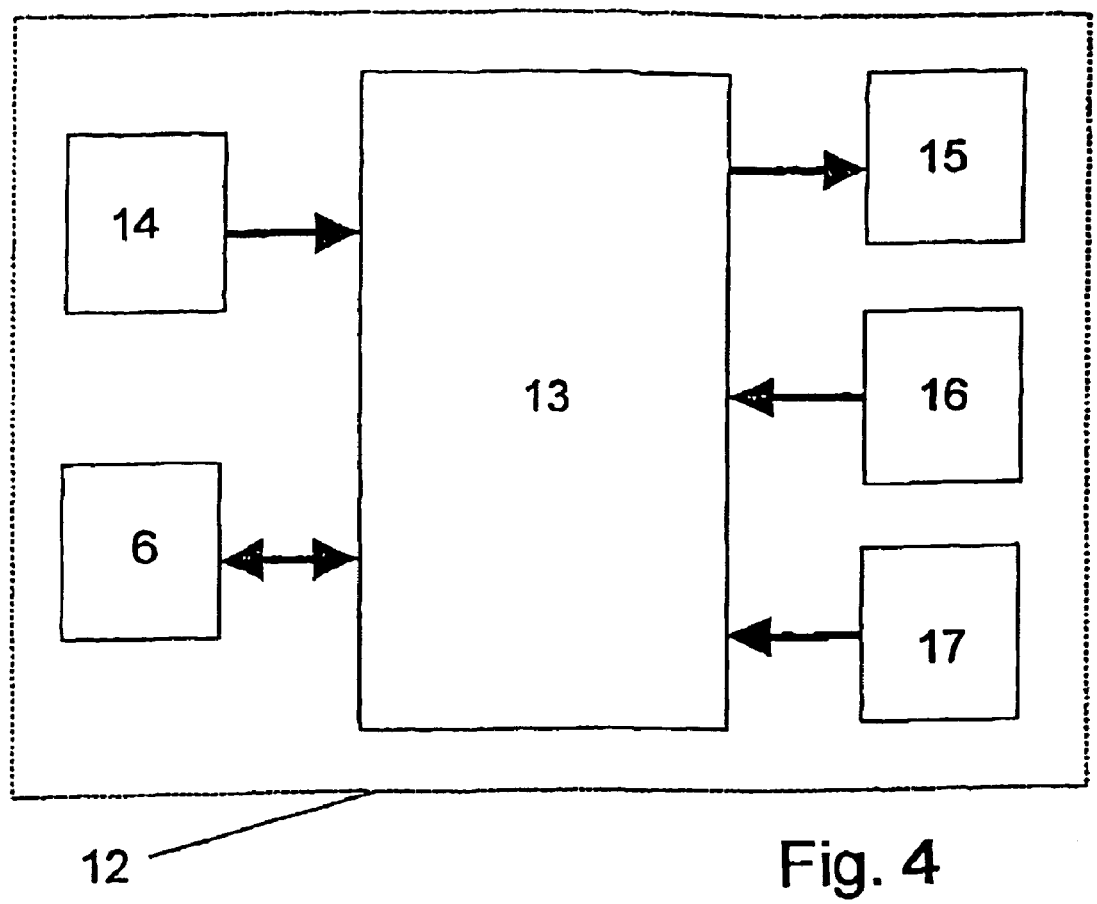
FIG. 4 shows a block diagram of a mobile transfer unit.
Figure 5:
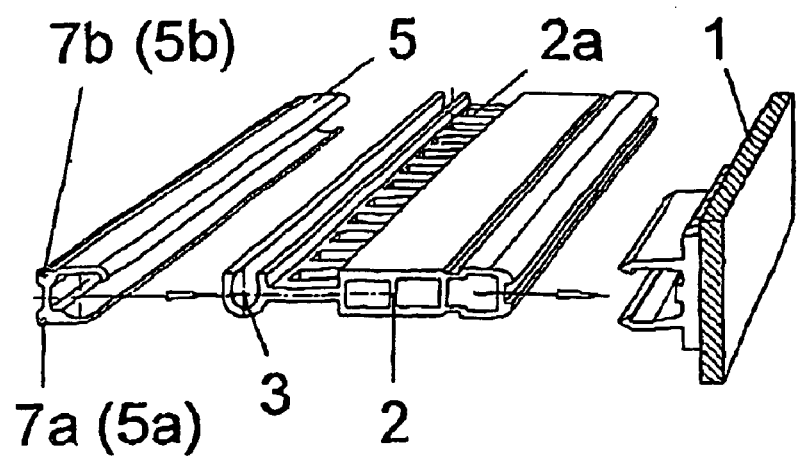
FIG. 5 shows a perspective view of a feeder bracket connected to the slide rail for the transfer units with a slip-on holder for the data transmission loop.

FIGS. 1 through 5 relate to an electric telpher system with non-contact inductive power transmission from a feeder to a multitude of mobile transfer units 12 that can travel on a slide rail 1 for carrying and hauling loads. Each mobile transfer unit 12 is equipped with a current collector 14 for non-contact power transmission from the feeder 4 that is connected to a power source and designed as a stranded conductor. The feeder 4 is arranged in the holding duct 3 of a feeder bracket 2 that is attached to the slide rail 1 and made of non-conductive material. As can be seen from FIG. 5, the feeder 2 comprises a mechanical coding 2a to allow for absolute position detection of the transfer unit 12 using a position scanner 17 (FIG. 4) attached to the transfer unit 12. The current collector 14 for inductive non-contact power transmission is designed as a U-shaped ferrite core with two windings and one electronic collector circuit per winding (not shown) to supply a controller 13 mounted to the transfer unit 12 as well as any associated sensing and control equipment 16 and the position scanner 17 with the required control voltage and to supply the drive unit 15 of the transfer unit 12 with the required higher drive power.

The ferrite core (not shown) encompasses the feeder 4 in such a way that the magnetic field lines 4.1 of the feeder 4 ensure the formation of a magnetic flux in the ferrite core for a sufficient magnetomotive force.

The transfer units 12 that are guided on the slide rail 1 and a central control station 18 exchange non-contact data signals by means of induction in the electric telpher with inductive power transmission as described above. A data transmission loop 7 consisting of two parallel wires 7a, 7b that are vertically stacked in the drawing plane is placed at a spacing and in parallel in front of the feeder 4. The two wires (conductors) 7a, 7b are connected at their respective ends by a terminating resistor $R_2$. The data transmission loop 7 is located in a geometrical position along (i.e., within), a field line 4.1 of the feeder 4 so that any interfering effects from the magnetic field on the data transmission loop 7 are minor. The exact geometrical arrangement of the data transmission loop 7 along a field line of the feeder 4 is achieved by means of a holder 5 to which the wires 7a, 7b are fixed in parallel and which comprises two holding ducts 5a, 5b. The holder 5 is designed as a slip-on element that can be locked onto the mounting groove 3 for the feeder 4.

According to FIG. 1, the electric telpher system in the present embodiment includes two sections (1 and 2) and therefore also two data transmission loops 7 with their associated terminating resistors $R_2$. Each data transmission loop 7 is direct-coupled via data feed lines 11 with a transmission station 10, and each transmission station 10 itself is connected to a central control station 18. The transmission station 10 includes a transmit and receive coupler 10.1 as well as a transmit section 10.2 and a receive section 10.3 for transmitting or receiving sinusoidal signals in the medium frequency range at two different fixed frequencies with a sufficient signal-to-noise ratio, in the present case between 50 kHz and 125 kHz. The sinusoidal signals that occur as two fixed frequencies in serial sequence represent coded digital 0/1 signals. A processing unit 10.4 connected to the transmit and to the receive sections 10.2, 10.3 is linked with the central control station 18 via the respective transmission station 10.

An inductive communication module 6 that is provided on each transfer unit 12 also includes a transmit and a receive coupler 6.3 and 6.4, a transmit section 6.5 and a receive section 6.6, for transmitting or receiving two sinusoidal signals or signal sequences at different fixed frequencies in the medium frequency range as digital data signals, and a processing unit 6.7 that is connected to a controller 13.

Data transmission, i.e. transmitting and receiving data back and forth at two fixed frequencies in the form of sinusoidal signal sequences via the data transmission loop that is direct-coupled with the transmission stations or from the communication module 6 on the transfer units 12 is inductive and non-contact. For this purpose, the communication module 6 is equipped with two E-shaped ferrite cores, the transmit ferrite core 6.1 comprising a transmit coil 8 and the receive ferrite core 6.2 located behind it in the drawing plane (not shown) comprising a receive coil 9, to send sinusoidal signals at different frequencies that correspond to digital pulse sequences (0; 1) from the controller 13 via the communication module 6 and the data transmission loop 7 to the transmission station 10 and to the central control station 18, or receive data in reverse direction and forward it via the processing unit 6.7 to the controller 13 to control, for example, the drive unit 15.

The invention is not limited to the embodiment described above, of course. Within the scope of characteristics relevant to the invention which, for an electric telpher with non-contact (inductive) power transmission to the transfer units, consist in likewise inductive data communication between the transfer units and a central control station by means of two sinusoidal wave sequences of different frequencies via a data transmission loop with terminating resistors at both ends and parallel wires located within a magnetic field line of the feeder for inductive power transmission using ferrite cores, each equipped with a transmit or receive coil, expert modifications are conceivable for implementing higher-order functionality such as visualization, preventive maintenance, or centralized anticollision protection.

The invention claimed is:

1. An electric telpher with non-contact power transmission between a feeder arranged at a spacing along a slide rail for a mobile transfer unit and an inductive current collector on the transfer unit as well as with non-contact data transmission between a central control station and a controller installed in the transfer unit, wherein a data transmission loop with terminating resistors at both ends and two parallel conductors that are located in one and the same field line of the feeder is arranged at a defined spacing along the feeder, in that said data transmission loop is direct-coupled with a central control station via a transmission station and inductively connected with the controller of the transfer unit via a communication module; said communication module comprising transmit and receive ferrite cores with a transmit or receive coil at a spacing to the data transmission loop for inductive transmission of digital signals in the form of sinusoidal sequences at two different frequencies in a medium frequency range.

2. The electric telpher according to claim 1, wherein a holder can be mounted to a feeder bracket that holds the feeder, wherein the two conductors of the data transmission loop can be fixed in parallel to each other in holding ducts.

3. The electric telpher according to claim 2, wherein the holder is designed as a slide-on accessory bridging a holding duct of the feeder bracket.

4. The electric telpher according to claim 1, wherein the transmit and receive ferrite cores have an E-shaped design and in that respective center webs that face the data transmission loop at a distance house either a transmit coil or a receive coil.

5. The electric telpher according to claim 4, wherein a transmit and a receive coupler, a transmit and a receive section, and a processing unit connected to the controller are assigned to the transmit and receive ferrite cores in the communication module.

6. The electric telpher according to claim 1, wherein the transmission station connected to the data transmission loop via a data feed line comprises a transmit and receive coupler, a transmit and a receive section as well as a processing unit connected to the central control station.

7. The electric telpher according to claim 1, wherein the two different fixed frequencies of coded digital data transmitted by induction are sinusoidal signals with a sufficient signal-to-noise ratio.

8. The electric telpher according to claim 1, wherein the controller of the mobile transfer unit is connected to a drive unit, sensing and control equipment, and a position scanner.

9. The electric telpher according to claim 1, wherein each of multiple telpher sections is assigned to a data transmission loop and a transmission station connected to it.

10. The electric telpher according to claim 1, wherein the capability of the transfer units to receive all data transmitted on the data transmission loop can be used for a local, direction-independent collision protection function of all mobile transfer units.

* * * * *